United States Patent
Vancsa

[15] 3,652,794

[45] Mar. 28, 1972

[54] APPARATUS AND METHOD FOR TRANSMITTING INTELLIGENCE WITH STEPPED WAVES

[72] Inventor: Gyorgy I. Vancsa, Newark, N.J.

[73] Assignee: Westinghouse Electric Corporation, Pittsburgh, Pa.

[22] Filed: Apr. 30, 1970

[21] Appl. No.: 33,429

[52] U.S. Cl. ..............................178/67, 325/38 B, 332/11 D

[51] Int. Cl. ..............................H04l 27/24

[58] Field of Search ..............................178/66 R, 66 A, 67; 321/5, 321/519 R; 325/30, 38 A, 38 B, 163; 332/9, 11 D; 179/15 AZ

[56] References Cited

UNITED STATES PATENTS

| | | | |
|---|---|---|---|
| 3,257,601 | 6/1966 | Bizouard et al. | 321/5 |
| 3,241,033 | 3/1966 | Peaslee et al. | 321/5 |

*Primary Examiner*—Robert L. Griffin
*Assistant Examiner*—Albert J. Mayer
*Attorney*—A. T. Stratton, C. L. Freedman and J. L. Stoughton

[57] ABSTRACT

A fast operating phase-shift-controlled system for transmitting information in which a simulated sine wave is generated digitally and in which the phase of the generated wave is shifted solely at the 0° and 180° points to eliminate "ringing" and thereby increase the speed at which data may be transmitted.

9 Claims, 11 Drawing Figures

WITNESSES

Alfred G. Colaizzi

Leon M. Garman

INVENTOR
Gyorgy I. Vancsa

John L. Stoughton

ATTORNEY

APPARATUS AND METHOD FOR TRANSMITTING INTELLIGENCE WITH STEPPED WAVES

BACKGROUND OF THE INVENTION

To assure efficient transmission of coded messages over presently available transmission mediums, it is necessary to transform the data to a shape that matches the characteristics of the transmission medium. Present techniques use sine wave carriers. The carriers are modulated by information to be transmitted. There are three major types of modulation used. Amplitude modulation, phase modulation, and frequency modulation. All of these modulation techniques manipulate a sine wave which is basically an analog quantity. Generally, such sine waves are generated by tuned circuits and the modulating information is transmitted by changing the carrier amplitude, phase or frequency.

If only a half duplex communication channel is available, it is necessary to turn the carrier on and off. In order to make the most use of the communication channel, the turn-around time should be reduced to the minimum. If transients are introduced at the turnaround points or at the modulation points "ringing" occurs. This ringing should be reduced as much as possible since the transients so introduced may provide undesired information.

DESCRIPTION OF PREFERRED EMBODIMENT

Figure 1:
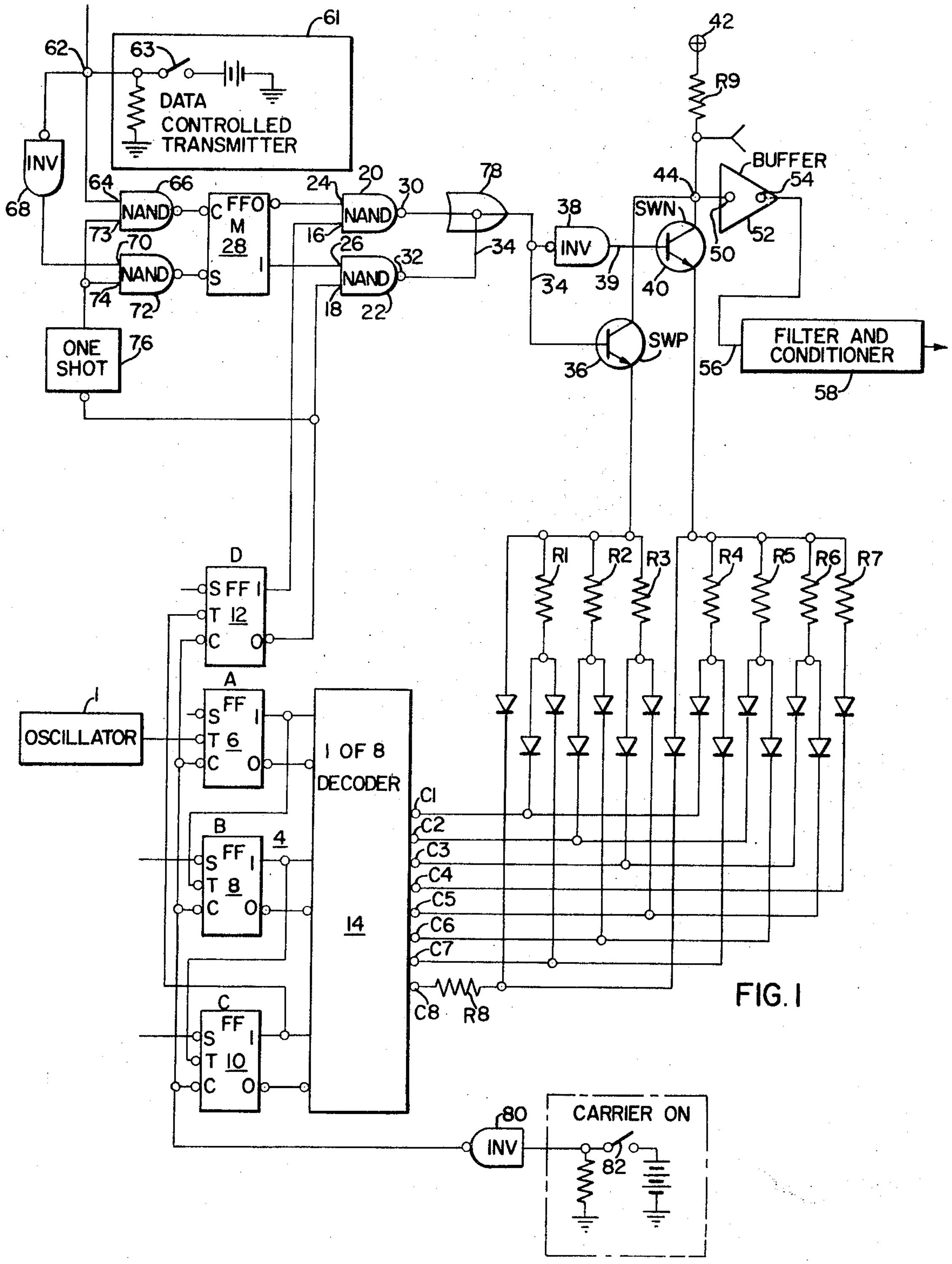
FIG. 1 is a block diagram showing a transmitting system embodying the invention.

Referring to the drawings by characters of the reference, the digital phase shift control system comprises an oscillator 1 for providing operating pulses at a predetermined constant frequency. The oscillator 1 is connected to supply operating pulses to a countdown mechanism 4 which, as illustrated, comprises a plurality of flip-flops 6, 8, 10, and 12. The output connections of the flip-flop 6, 8 and 10 are connected to the input connections of a decoder 14 having output terminals C1, C2, C3, C4, C5, C6, C7 and C8.

The output of the oscillator 1 is, during standby prevented from driving the flip-flops 6—12 by a blocking signal supplied to their terminals C. Upon removal of the blocking signal the oscillator is permitted to drive the flip-flop 6 which alternates the polarity of energization of its output terminals 1 and 0. The output terminal 1 of flip-flop 6 is connected to the terminal T of flip-flop 8, The terminal 1 of flip-flop 8 to the terminal T of the flip-flop 10, and the terminal 1 of the flip-flop 10 to the terminal T of the flip-flop 12 whereby the frequency at which the driven flip-flop reverses the output potential of its output terminals 1 and O is half the rate at which the driving flip-flop alternates the output potential between its output terminals.

The output terminal 1 and O of the flip-flop 12 are connected respectively to input terminals 16 and 18 of the NAND devices 20 and 22. The other input terminals 24 and 26 of the NAND devices 20 and 22 are connected to the O and 1 output terminals of a flip-flop 28. The output terminals 30 and 32 of the NAND devices 20 and 22 are connected to a bus 34 which directly connects with the base of a positive half cycle controlling transistor 36 and through an inverter 38 to the negative half cycle controlling transistor 40. As will be explained below, if at least one of the input terminals of each of the NAND devices 20 and 22 is at its lower or ground potential, the bus 34 will be maintained at a higher positive potential to render the positive half cycle controlling transistor 36 conducting and permit the energization of the circuits through the resistors R1, R2, R3 and R8 and the associated diodes as determined by the decoder 14. When at least one of the output terminals of the NAND devices 20 and 22 are at ground potential, inverting network 38 energizes the bus 39 with a positive potential whereby the transistor 40 is rendered conducting to permit the energization of the circuit through the resistors R4, R5, R6, R7, and R8.

With the positive half cycle transistor 36 conducting current will flow from the positive input terminal 42 through the resistor R9, the transistor 36 and the one of the resistors R1, R2, R3, or R8 as determined by the decoder 14. The relative magnitudes of the resistors R8 and R9 are so determined that when current flows from the positive input terminal 42 through the resistor R9, transistor 36, resistor R8 and terminal C8 of decoder 14, the potential at the output terminal 44 will assume an initial potential which forms the zero line 46 of the digitally produced output sine wave 48 illustrated in FIG. 2. The output terminal 44 is connected to the input terminal 50 of a buffer or amplifier network 52, the output terminal 54 of which is connected to the input terminal 56 of a filter and conditioner network 58. The output terminal 60 of the network 58 is connectable to a transmission circuit (not shown) for transmitting the output signal to a receiving station (not shown).

The decoder 14 has three pairs of input terminals connected to the pairs of output terminals O and 1 of the flip-flops 6, 8 and 10 to sequentially connect the terminals C1–C8 to ground and thereby control the circuit through which current flows from the input terminal 42. Assuming a half cycle in which transistor 36 is conductive, the decoder progressively connects the terminals C8, C1, C2, C3, C4, C5, C6, C7 and C8 to ground and current flows sequentially through the circuits which include the resistors R8, R1, R2, R3. The magnitudes of the resistors R1, R2 and R3 are proportioned to provide the voltage magnitudes of the steps which occur during the time periods $t_2$–$t_3$, $t_3$–$t_4$ and $t_4$–$t_5$ and the companion magnitudes of the steps of the periods $t_6$–$t_7$, $t_7$–$t_8$ and $t_8$–$t_9$. It will be noted that there is no connection through transistor 36 to the C4 terminal so that during the time interval $t_5$–$t_6$ during which period the maximum peak voltage of the sine wave occurs, the voltage at terminal 44 is substantially the maximum voltage applied to the positive input terminal 42.

The magnitudes of the resistances of the resistors R4, R5 and R6 are related to the magnitude of the resistance of the resistor R9 similarly to the relation of resistors R1, R2 and R3 to the resistor R9 except in the opposite manner to provide the voltage levels of the curve 48 during the time intervals $t_{18}$–$t_{19}$, $t_{19}$–$t_{20a}$' $t_{20}$–$t_{21}$, $t_{22}$–$t_{23}$, $t_{23}$–$t_{24}$, and $t_{24}$–$t_{25}$. In the case of the negative half cycle, a circuit is provided to the output terminal C4 through the resistor R7. The magnitude of the resistance of this resistor R7 is proportioned to the magnitude of the resistance of the resistor R9 to provide the voltage step of the period $t_{21}$–$t_{22}$ which corresponds to the step of the period $t_5$–$t_6$ of the positive half cycle.

The magnitude of the voltage during the steps $t_2$–$t_3$ .... $t_{16}$–$t_{17}$ follows the sine law with the change in magnitude between the steps being equal to the cosine of the angle of the step produced simulated sine wave which is half way between the angle at which the step actually occurs. The basic concept of proving a simulated sine wave by steps which change the output magnitude in accordance with the cosine law is not new to me, it having been taught by Heinrich and Kernick in their patent application Ser. No. 117,966 filed June 19, 1961 and assigned to the same assignee as is this application, now U.S. Pat. No. 3,491,282 dated Jan. 20, 1970.

The phase of the wave 48 is controlled in accordance with the potential of the data input terminal 62 as determined by the data-controlled transmitter 61. Any suitable data transmitter which provides two voltage potentials at the input terminal 62 may be utilized. Diagrammatically, this data-controlled transmitter 61 is provided with a switch 63 which when in its open-circuit position permits the terminal 62 to remain at ground potential but which when in its closed position will raise the potential of terminal 62 to a predetermined positive potential with respect to ground. As indicated in FIG. 2, following a change in potential of the terminal 62 from a positive potential to ground potential as shown by the curves "Data IN" the phase of the wave 48 will reverse in phase as the result of the reversal of the position of the switch 63.

The phase reversal results from the change in the conductive relationship of the transistor 36 and 40 with respect to the output potentials of the flip-flop 12. For this purpose the terminal 62 is connected to one input terminal 64 of a NAND device 66 and through an inverter 68 to one terminal 70 of a NAND device 72. The NAND devices 66 and 72 have their output terminals connected respectively to the input terminals C and S of the flip-flop 28. The other input terminals 73 and 74 of the NAND devices 66 and 72 are connected to the output of a one-shot device 76 which is connected to O terminal of the flip-flop 12 and provides a positive pulse to each of the devices 66 and 72 each time that the O terminal of the flip-flop 12 is rendered negative or ground. The potential of the terminal 62 controls the potential at the input terminals 64 and 70 of the devices 66 and 72 respectively and because of the presence of the inverter 68 one thereof will be positive and the other thereof negative. Normally the one-shot device 76 applies negative or ground potential to the input terminals 73 and 74 and therefore any change in the potential of the signal supplied to the devices 66 and 72 from the Data-IN terminal 62 is ineffective to flip the flip-flop 28. Such a change in the supplied signal will, however, place the devices in condition to flip the flip-flop 28 when a positive signal is applied by the one-shot device 76. When the one-shot device 76 is actuated, positive potentials will be applied to both of the input terminals 73 and 74 ad the one of the NAND devices 66 and 72 having its other input terminal positive will be actuated to provide a negative or ground signal at its output terminal. If the terminal C or S of the flip-flop 28 to which the negative signal is applied has not just previously been rendered at ground potential the flip-flop 28 will flip and reverse the polarity of its output terminals O and 1. If there terminal had just previously been rendered at ground potential, the flip-flop 28 will not flip. The conditions which are shown in FIG. 2 to exist after the terminal 62 goes negative at time $t_8$, assuming the flip-flop 28 will be in a position in which its O output terminal is at positive potential and its 1 output terminal thereof is a negative or ground potential, the flip-flop 12 will be in a condition in which its 1 output terminal is at negative or ground potential and its O output terminal is at positive potential, the NAND devices 20 and 22 will have their input terminals 16 and 26 at ground potential so that the output terminal 30 and 32 thereof would be at a positive potential causing the positive half cycle transistor 36 to be conductive. When the one-shot device 76 is actuated to provide a momentary positive pulse, both terminals 73 and 74 momentarily become positive. Since only the NAND device 72 has both of its input terminals positive, only its output terminal is momentarily lowered to ground potential. This momentary ground potential is applied to the input terminal S of the flip-flop 28. This causes flip-flop 28 to reverse the relative potentials of its output so that the terminal 1 becomes positive and the terminal O goes to ground potential since the flip-flop 28 has not previously been flipped by a previous application of ground potential to its terminal S. The potential supplied to the input terminals 16 and 18 of the NAND devices 20 and 22 are reversed by the flip-flop 12 and the potential of the bus 34 remains positive. As may be seen by the subsequent positive half cycle of the wave 48 between the times $t_9$–$t_{17}$, the phase of the wave is shifted by 180°. While the change in data occurred during a half cycle, the phase reversal did not occur until the end of the half cycle.

Assuming an operating condition in which the Data-IN signal remained positive and the initial condition as described above, the one-shot device 76 will apply its positive potential pulse at the time $t_9$ to provide a positive potential at the terminals 73 and 74 as before. Under these conditions the terminal 64 rather than the terminal 70 will be positive and the NAND device 66 will be the device which has both input terminals positive and its output at ground. This ground excursion of the input C of the flip-flop 28 will not cause the flip-flop 28 to reverse the operative potentials of its output terminals O and 1. This results in a ground potential at the terminal 32 and on the bus 34 so that now the transistor 40 is conductive for the negative half cycle and the transistor 36 is rendered non-conductive with no change in Data-IN, no reversal of phase of the wave 48 occurs.

Figure 2:
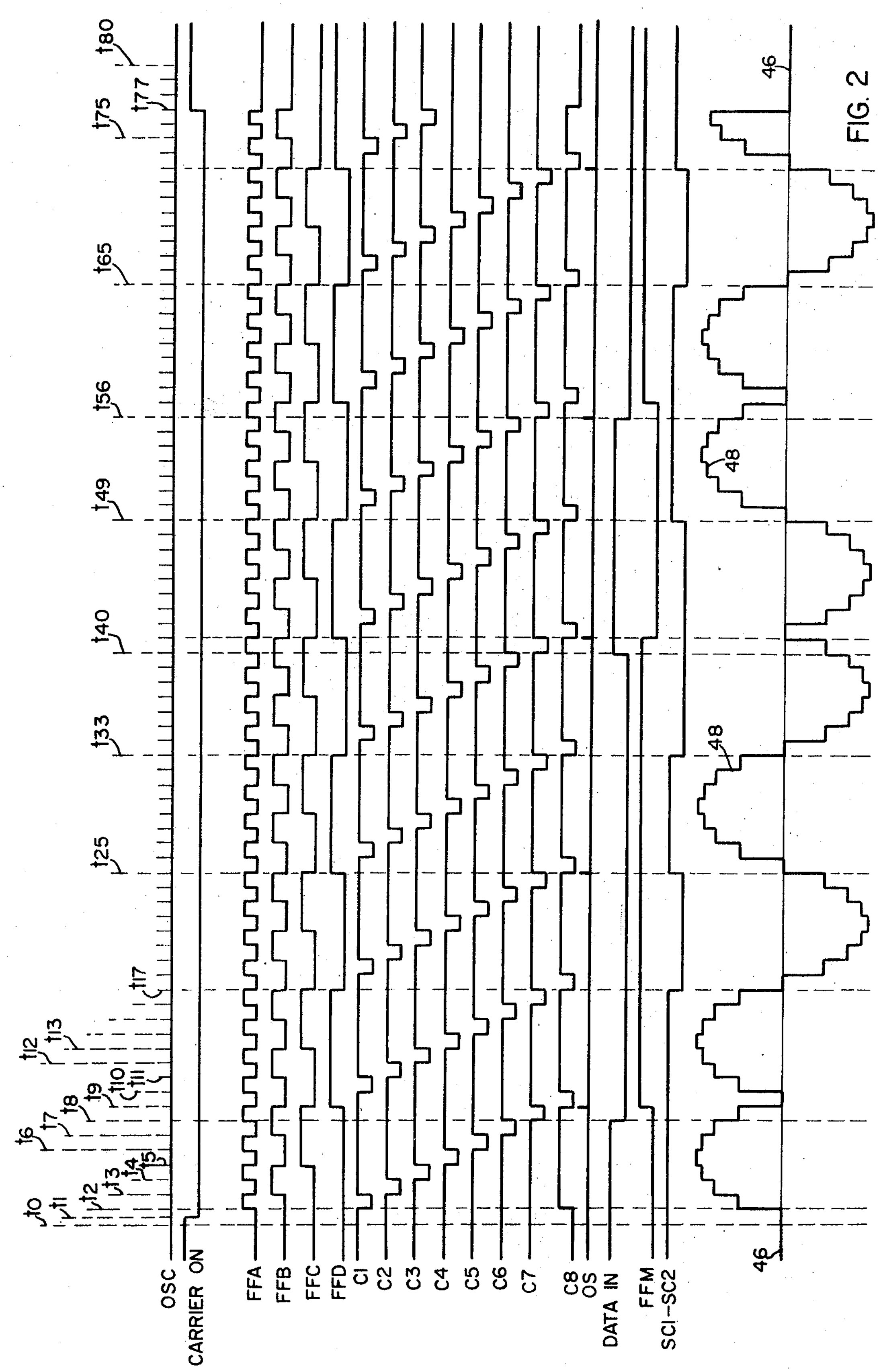
FIG. 2, shows curves which illustrate certain operating features of the invention; and, FIGS. 3–11 illustrate schematic circuitry which may be used in the blocks shown in FIG. 1.

As shown in FIG. 2, the "data input" did change at time $t_8$, the flip-flop 28 flipped and a second positive half cycle occurred between the time intervals $t_8$ and $t_{17}$ (180° shift). At the time $t_{17}$, the flip-flop 12 will be actuated back to its original "set" condition in which its output terminal 1 is at ground and its output terminal O is positive. When this occurs, and the data in terminal 62 is at ground potential as shown in FIG. 2, the terminal S of flip-flop 28 is momentarily lowered to ground potential. This will not, however, result in a flipping of the flip-flop 28 and its output terminals O and 1 will remain at ground and positive potentials respectively. Since at time $t_{17}$ the flip-flop 12 is flipped back to its original conditions in which its output terminals O and 1 are respectively at positive and ground potentials, the potential of both input terminals 18 and 26 of the NAND device 22 is positive. When this occurs the potential of the output terminal 32 of the device 22 goes to ground and, ineffective of the device 20, that bus 34 will be at ground potential. The symbol 78 diagrammatically indicates that the output terminals 30 and 32 of the NAND devices 20 and 22 are each connected to the bus 34 and that as long as both of the output terminals of the NAND devices 30 and 32 are positive the bus 34 will be positive. If either of the NAND devices 20 and 22 goes to ground potential, then the bus 34 will likewise go to ground potential.

Figure 3:
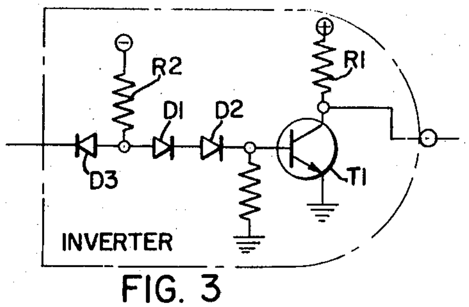

While the figures 3 through 11 each indicate schematic diagrams for the blocks set forth in FIG. 1, other suitable equivalent circuitry may be used. FIG. 3 shows a suitable schematic circuit for the inverters 38, 68 and 80. The circuit includes a transistor T1 having its emitter grounded and its collector connected to an output terminal and connected through a resistor R1 to a source of positive potential. The base of the transistor T1 is connected through a pair of diodes D1, D2 and a resistor R2 to a positive source of potential. The common connection between the resistor R2 and the diode D1 is connected to the anode of a diode D3, the cathode of which is connected to the input terminal of the inverter. If the input terminal of the inverter is maintained at ground potential, current will flow from the positive source through resistor R2 and the diode D3 so that no base current will flow through the series connected diodes D1 and D2 to the transistor T1. Under this condition, the output terminal of the inverter will be maintained substantially at the positive potential of the source connected to the resistor R1. If a positive blocking potential is applied to the cathode of the diode D3, base current will flow from the resistor R2 through the diodes D1 and D2 and the base of the transistor T1. This renders the transistor T1 conducting to connect its output terminal to ground and reduce the output potential of the inverter to substantially ground potential.

Figure 4:
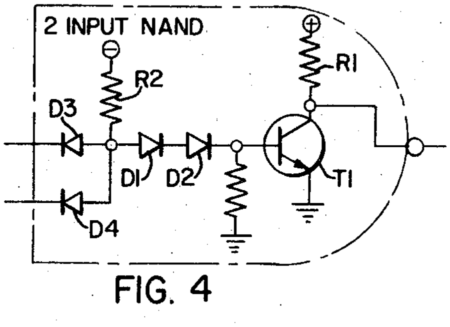

FIG. 4 illustrates a two input NAND device which may be used for the NAND device 20, 22, 66 and 72. It will be appreciated that the NAND device is substantially identical to the inverter except that it includes a second input terminal connected through and a diode D4 to the common connections of the resistor R2 and the diode D1. As long as one of the input terminals of the NAND device is maintained at ground potential base current will be shunted from the transistor T1 and the output terminal thereof will be maintained at a positive potential. It will also be appreciated that when the outputs of two of the NAND devices as, for example, devices 20 and 22 are connected to a common bus as indicated in FIG. 1, that the rendering of the transistor T1 of either NAND device 20 or 22 will maintain the potential of the common bus (34) at ground potential. This arrangement is indicated by the symbol 78.

Figure 6:
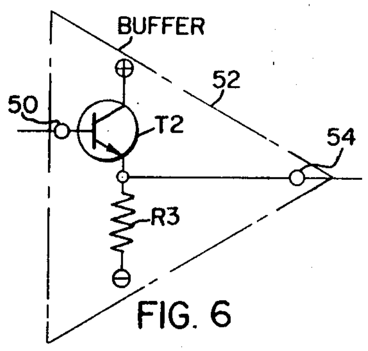

The buffer 52 is a high impedance device and as shown in FIG. 6 includes a transistor T2 having its collector connected to a positive source of potential and its emitter connected to the output terminal 54 and to ground through a resistor R3. The base of the transistor T2 is connected directly to the input terminal 50. When a positive base drive potential is supplied to the input terminal 50, the transistor T2 conducts in accordance with the magnitude of the base current and a variable current flows from the positive source of potential to ground through the emitter collector circuit of the transistor T2 and resistor R3. This provides a variable potential across the resistor R3 and between the output terminal 54 and ground to provide an output signal which follows the potential fluctuations of the signal applied to the input terminals 50. As indicated above, this output terminal 54 is connected to the input terminal 56 of the filter and conditioner 58.

Figure 5:
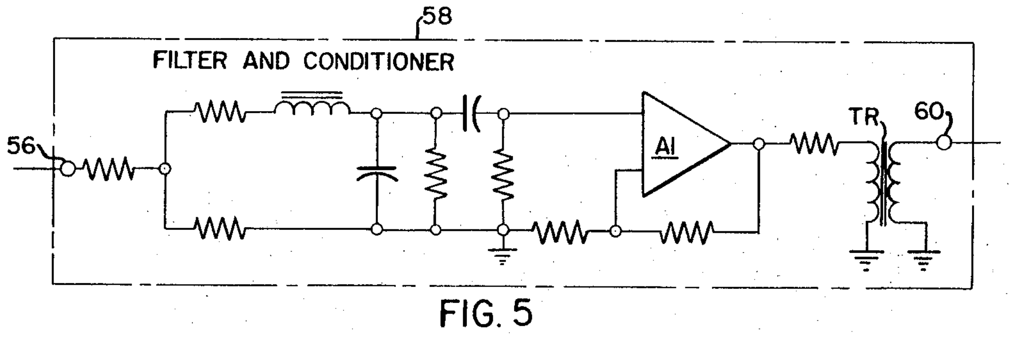

The schematic circuit of a typical filter and conditioner is shown in FIG. 5 and includes an operational amplifier A1 having its input terminal connected through suitable filtering circuitry to the input terminal 56 and its output terminal connected to energize the primary winding of a transformer TR. The secondary winding of the transformer TR is connected between the output terminal 60 and ground and when energized with a wave similar to wave 48 provides a filtered sine wave of which may be transmitted through any suitable transmission network as, for example, a telephone wire (not shown) to a receiving apparatus (not shown) which is sensitive to the phase of the sine wave supplied thereto.

Figure 7:
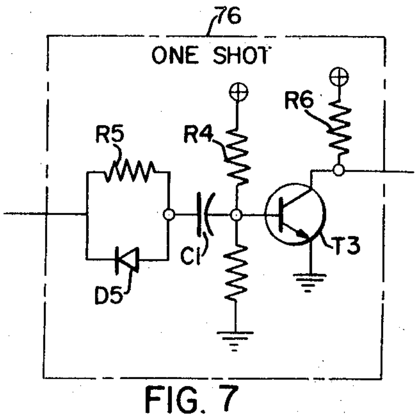

Suitable circuitry for the one-shot device 76 is shown in FIG. 7 and comprises a transistor T3 having its collector connected to the output terminal of the one-shot and its emitter connected to ground. The base of the transistor T3 is connected through a resistor R4 to a positive source of potential and through a capacitor and resistor network to the input terminals of the one-shot device 76. Base current normally flows through the transistor T3 so that its output terminal is normally maintained at ground potential. With the input potential at a positive potential the capacitor C1 will be normally maintained charged with its terminal connected to the base negative with respect to its terminal connected to the resistor R5. It will be recalled that this input terminal of the one-shot 76 is connected to the O terminal of the flip-flop 12. When the flip-flop 12 flips to place the potential of its O terminal at ground potential as indicated in FIG. 2 (time $t_9$) the potential of the capacitor C1 will be immediately lowered and base current will be temporarily interrupted to the transistor T3. When this occurs, the transistor T3 will terminate its conduction and the output terminal will be momentarily raised to substantially that of the positive source of potential connected to the resistor R6. The capacitor C1 soon changes its changed condition, as determined by the RC constant of its change controlling network which extends to ground through the diode D5.

Figure 8:
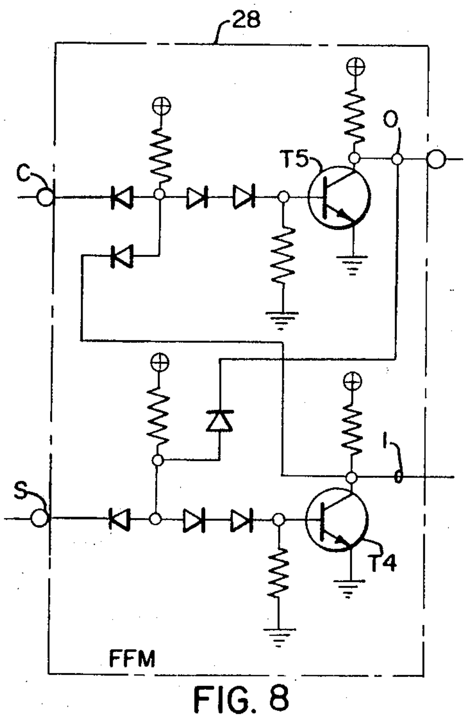

FIG. 8 shows schematically a circuit which may be used for the flip-flop 28. This circuit includes transistors T4 and T5 having their collectors connected to output terminals O and 1 and to sources of positive potential through resistors R1. The bases are connected through diodes D1 and D2 and resistors R2 to sources of positive potential and through diodes D1, D2 and D3 to the input terminals C and S. It will be apparent that the flip-flop 28 is essentially a pair of interconnected NAND devices of the type illustrated in FIG. 4 in which the input terminal including the diode D4 is connected to the output terminal of the other NAND device thereof. With the flip-flop 28 placed in a first condition, the transistor T4 thereof will be conducting to maintain the output terminal O at substantially ground potential and the transistor T5 will be non-conducting whereby the output terminal 1 thereof will be maintained at positive potential. Under these conditions, it will be appreciated that as long as a positive potential is at the input terminal S the base current will continue to flow to the transistor T4 and the output terminal 1 will be maintained at ground potential irrespective of any change in potential of the input terminal C. When however the potential applied to the input terminal S is lowered to ground potential, base current will be shunted to ground from the transistor T4 which transistor will thereupon be rendered block to raise the potential of the output terminal 1 to a positive potential. When this occurs, a positive potential is supplied to block the formerly conducting diode which had been shunting base current from the transistor T4 to maintain that transistor blocked. If when this occurs, the potential at the input terminal C is positive, the transistor T5 will thereupon conduct and lower the potential of the output terminal O to substantially that of ground. Thereafter the potential of the input terminal S may be changed between positive and ground potential without further effect on the flip-flop. If however, the potential of the input terminal C is subsequently lowered to ground potential the flip-flop 28 will flip into a condition into which the transistor T5 becomes blocked and if at the same time the potential applied to the input terminal S is positive, the transistor T5 will conduct to again place the output terminal 1 at ground potential.

Figure 9:
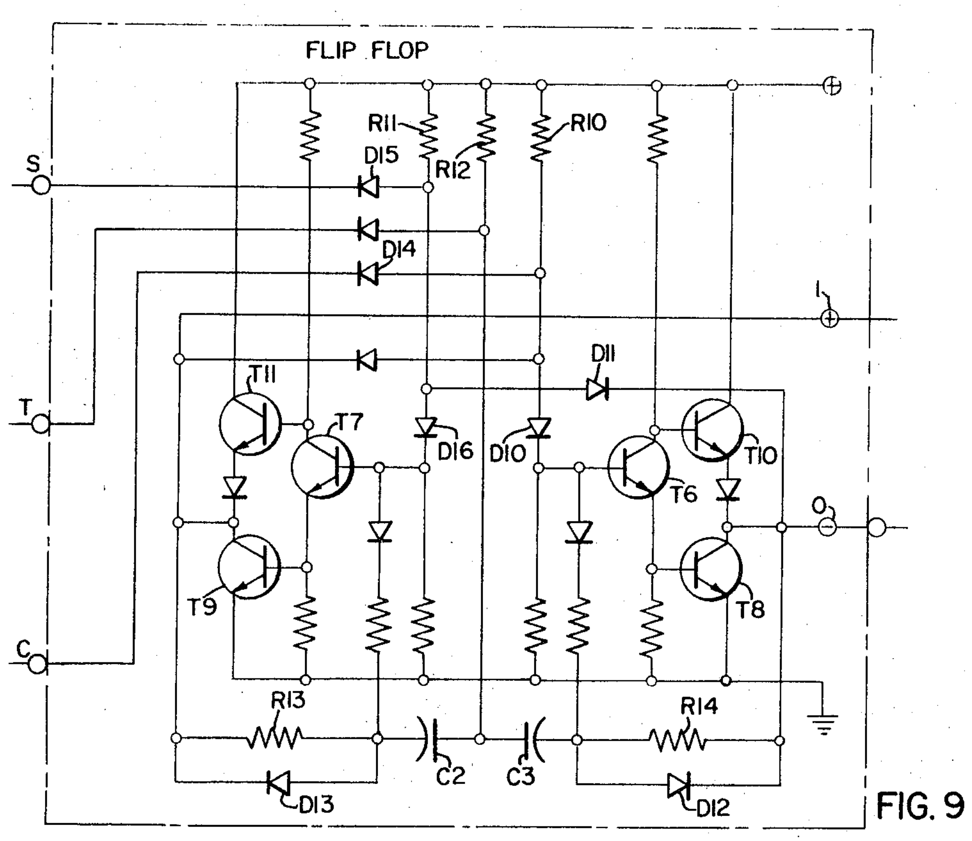

FIG. 9 illustrates schematically a suitable network for the flip-flops 6–12 which are provided with output terminals 1 and O and input terminals S, T and C. The S terminal in accordance with applicant's network are not used and for this purpose could be omitted. The flip-flop of FIG. 9 includes a plurality of transistors T6, T7, T8, T9, T10 and T11. When the potential of the input terminal C is rendered GND, or negative, providing that terminal S is positive, base current flows from the positive bus thereof through the resistor R10, diode D14, to the ground bus. Since there is no base current to transistor TG it becomes nonconducting, and the base current to transistor T6 renders the output O positive. Since diodes D11 and D15 are both reverse biased, current will flow from the positive terminal through resistor R11 and diode D16 into the base of transistor T7. Transistor T7 turns on and supplies base current to transistor T9, turning it on. Thus terminal 1 now is on ground potential. This is the initial or reset condition of the flip-flops 6, 8, 10 and 12 of FIG. 1. The flip-flop will remain in this operating condition even though the ground potential applied to the input terminal C is subsequently removed.

During the interval in which base current flows through the transistor T7 through the diode D16, it also flows through the diode D13 and resistor R12 to the common terminal of the capacitors C2 and C3. During this interval the terminal of the capacitor C2 is maintained at substantially ground potential by reason of its connection through the diode D13 to the grounded collector emitter circuit of the transistor T9. The terminal of the capacitor C3 away from the capacitor C2 is similarly connected through a diode D12 to the collector of the transistor T8, and through a resistor R14. As explained above, the potential of the collector of the transistor T8 is substantially that of the positive bus and therefore the terminal of the capacitor C3 connected through the resistor R14 thereto is maintained positive, the same potential as the C3 terminal which is connected to the capacitor C2.

If now a negative potential is applied to the input terminal T, the common connection between the capacitors C2 and C3 will be lowered to substantially that of ground potential. Since the capacitor C2 was charged with the terminal thereof connected to the capacitor C3 positive with respect to its other terminal, the lowering of the input terminal T to ground potential will cause charging current to flow to the capacitor C2 thereby terminating the base current flow to the transistor T7. This terminates emitter-collector conduction in the transistor T7 and the base current to the transistor T9. When this happens a transistor T11 reconducts and the collector of the transistor T9 is connected through the emitter-collector circuit of the transistor T11 to the positive bus and the potential of the output terminal 1 is rendered positive. When this occurs, base current flows to the transistors T6 and T8 which thereupon conduct to shunt out the base current to the transistor T10 thereby reducing the potential of the output terminal O to ground potential. A subsequent change in the potential of the input terminal T to a positive potential has no effect upon the flip-flop. When however, this potential of the input terminal T is subsequently lowered to ground potential the now charged capacitor C3 will cause the transistors T6 and T8 to become non-conducting and the conduction of the transistor T10 and thereafter the rendering of the transistors T7 and T9 blocked blocks the transistor T6 to flip the flip-flop into its originally described state.

Figure 10:
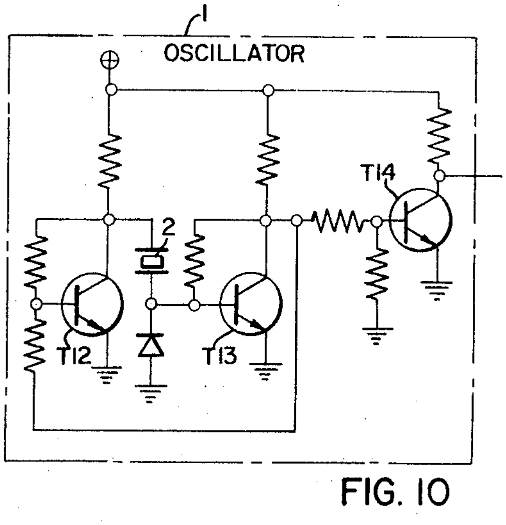

The oscillator 1 may take any suitable form as is shown in FIG. 10 which comprises a plurality of transistors T12, T13, and T14. The transistors T12 and T13 are arranged to oscillate in accordance with the oscillating frequency of the crystal 2 and are connected by means of the amplifying transistor T14 to provide positive output pulses at the output terminal, which as described above, is connected to the input terminal T of the flip-flop 6. The negative going pulses are used to flip the flip-flop 6.

Figure 11:
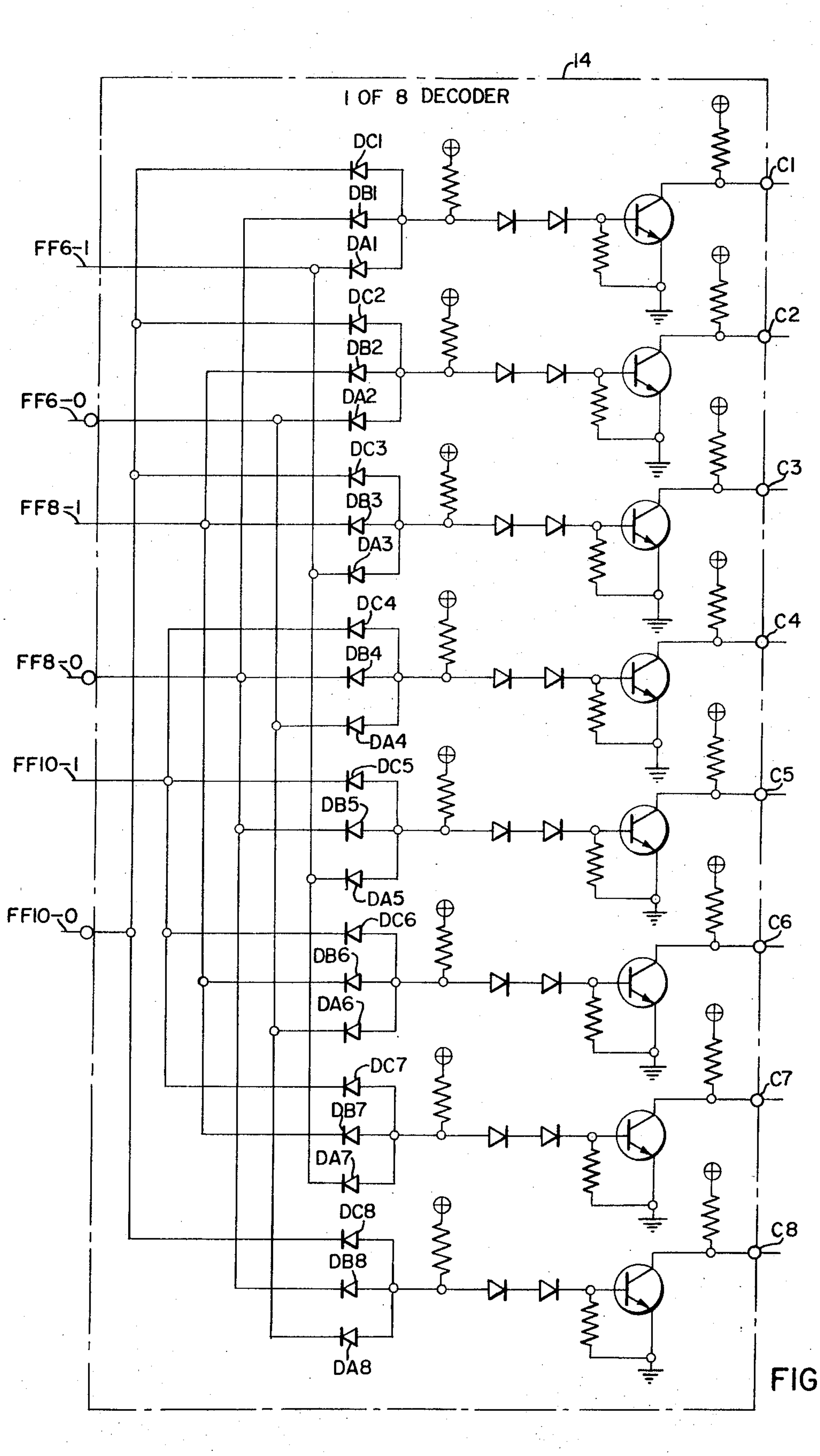

FIG. 11 illustrates schematically a circuit which may be used for the decoder and comprises essentially eight three-input NAND devices similar to the device shown in FIG. 4 but which distinguish by being provided with an additional 1 input circuit embodying an additional diode D4A.

As illustrated, the cathode of the diodes DC associated with the output terminals C1, C2, C3 and C8 are each connected to the input terminal 10–O of the decoder 14 which is connected to the O output terminal of the flip-flop 10. Similarly, the cathodes of the DC diodes associated with the output terminals C4, C5, C6 and C7 are all connected together and to the 1 terminal of the flip-flop 10. Diodes DB associated with the output terminals C1, C4, C5 and C8 are all connected together and to the O terminal of the flip-flop 8; the 1 terminal of the flip-flop 8 being connected to the cathodes of the diodes DB associated with the output terminals C2, C3, C6 and C7. The diodes DA associated with the output terminals C1, C3, C5 and c7 are each connected together and to the 1 terminal of the flip-flop 6. The O terminal of this flip-flop 6 is connected to the DA diodes associated with the output terminals C2, C4, C6 and C8.

It will be appreciated from the foregoing description of the NAND device of FIG. 4 that, unless a positive potential is applied to the cathode of all of the diodes associated in the base circuit of the transistor of a three-input terminal NAND device, the associated transistor will not conduct and the associated output terminal will be at a positive potential. If a positive potential is applied to all of the cathodes of these diodes, the associated transistor will conduct and the associated output terminal will be connected to ground to complete the desired one of the circuits through the resistors R1–R9 of FIG. 1. With the interconnection as set forth in FIG. 11, between the input terminals of the decoder 14 and the output terminals of the flip-flops 6–10 only a single one of the input terminals C1–C8 will be connected to ground at any one pulse supplied by the oscillator 1.

It is believed that the remainder of the description can best be explained by reference to the operation of the apparatus which may best be understood by a reference to the curves as shown in FIG. 2. The line marked OSC represents the output pulses from the oscillator 1 which, with certain exceptions as will be noted below, define the time periods $t_0$–$t_{80}$. The line designated CARRIER ON represents the operation of the transmission controlling switch 82 which, when closed, places a positive potential on the input terminal of the inverter 80 and which when opened causes the input potential of the input terminal of the inverter 80 to assume ground potential. As described above, the potential of the output terminal of the inverter 80 will be opposite to that of the input potential. Prior to the time $t_1$, the switch 82 will be in closed position and positive potential will be present at the input to the inverter 80. This results in a ground potential being applied by the inverter to the C terminals of the flip-flops 6, 8, 10 and 12. The application of the ground potential places the flip-flops in initial or reset position with the O terminal positive and the 1 terminal at ground potential. The continued application of the ground potential prevents actuation of the flip-flops by the oscillator.

At time $t_1$, the switch 82 is opened and a ground potential is applied to the input terminal of the inverter 80 so that output potential is raised to positive potential which positive potential is applied to the terminals C of the flip-flops 6 through 12. This renders the flip-flops 6 through 12 responsive to the output pulses of the oscillator 1. The first pulse subsequent to closure of the switch 82, occurs at time $t_2$ as indicated in FIG. 2. The negative going portion of this pulse causes the flip-flop 6 to flip and place its output terminal 1 at a positive potential and its output terminal O at ground potential. This reversal of potential at the output terminals of flip-flop 6 results in the application of a positive potential to the cathodes of the diodes DA1, DA3, DA5 and DA7 and the grounding of the cathodes of the diodes DA2, DA4, DA6 and DA8. As will become apparent from the description below in the "stand-by" or "at rest" condition with the switch 82 closed, the cathodes of all of the diodes DA8, DB8 and DC8 were at a positive potential whereby the associated transistor was conductive to complete the energizing circuit through resistors R8 and R9 and the conductive one of the transistors 36 and 40. At the time $t_1$ switch 82 is opened and at the next negative going pulse of the oscillator, time $t_2$, the flip-flop 6 is flipped. This causes the cathode of the diode DA8 to become connected to ground and the transistor becomes nonconducting. This flipping of the flip-flop 6 also placed a positive potential on the cathode of the diode DA1 and since at this time the cathode of each of the diodes DB1 and DC1 were already positive, the associated transistor becomes conductive to connect the output terminal C1 to ground. This is indicated by the curve C1 of FIG. 2. The curve FFA represents the operation of the flip-flop 6.

At the time $t_3$, the oscillator again, on its negative going portion of its pulse, flips the flip-flop 6 back to its original condition in which its output terminal O is positive and its output terminal 1 is grounded. The change in potential of the output terminal 1 of the flip-flop 6 from a positive to a ground potential results in the rendering of the transistor associated with the output terminal C1 non-conducting and the flipping of the flip-flop 8 to place its output terminals 1 and O at positive and ground potentials respectively. This results in the conduction of transistor associated with the output terminal C2 and the connection of the terminal C2 to ground as indicated by the curve C2. The curve FFB indicates the operations of the flip-flop 8.

In substantially the same manner, the flip-flops 6–10 will be flipped by the oscillator pulses to sequentially connect the output terminals C1–C8 to ground. The curves C1–C8 of FIG. 2 represents this operation and the curves FFA, FFB and FFC represent the operation of the flip-flops 6, 8 and 10.

The curve Data IN of FIG. 2 indicates the operation of the data controlled transmitter 61; the raised portion of the curve indicating a positive potential at the input terminal 62 caused by closure of the switch 63 and the lowered portion indicating a grounded potential at the terminal 62 resulting from the opening of the switch 63. The curve FFM indicates the operation of the flip-flop 28. The lowered portion of curve FFM indicates that the 0 output terminal O is at a positive potential and the output terminal 1 is at ground potential. The raised portion of the curve indicates that the output terminal 1 is at a positive potential and the output terminal O is at ground potential. The curves SC1, SC2 indicate the combined output potential supplied by the NAND devices 20 and 22 to the bus 34. The raised portions indicates the bus 34 to be a positive potential and the lowered portions indicates the bus 34 is at a ground potential. When the bus 34 is at a positive potential, the transistor 36 is conductive to provide for a positive half cycle of the output wave 48 and when the bus 34 is at ground potential, the inverter 38 provides a base drive current to render the transistor 40 conductive for the negative half cycle of the output wave 48.

As indicated by the curve 48, the output wave at the output terminal 44 is a digitally simulated sine wave having a zero or neutral axis 46 which in the present embodiment is at a potential above ground potential and is the result of the connecting of the terminal C8 to ground. During the existence of this connection current flows from the positive input terminal 42 through the resistor R9, the conductive one of the transistors 36 and 40 and the resistor R8. The presence of the DC bias voltage is not necessary and if other circuitry were utilized might well be absent. With the terminal C8 disconnected from ground and the input terminal C1 connected to ground and with the positive half cycle transistor 36 conductive as indicated at time $t_2$ in FIG. 2, current flows through the resistors R1 and R9 to establish the first raised voltage step which occurs during the time interval $t_2$–$t_3$. At time $t_3$, the terminal C1 is disconnected from ground and the terminal C2 is connected to ground. Current then flows through the resistors R2 and R9 to establish the next step of the wave which occurs during the time interval $t_3$–$t_4$. At $t_4$ the terminal C2 is disconnected from ground and the terminal C3 is connected to ground. Current then flows through the resistors R3 and R9 to provide the raised portion of the curve 48 which occurs during the time interval $t_4$–$t_5$. At $t_5$, the terminal C3 is disconnected from ground and the terminal C4 is connected to ground. In the positive half cycle the connection of the terminal C4 to ground is without effect since this terminal is not connected to the resistor R9 through the positive half cycle transistor 36. The disconnection of the terminal C3 from the ground however interrupts the circuit through the resistor R3 and permits an increase of the potential at the terminal 44 to provide the portions of the curve 48 which exists during the time interval $t_5$–$t_6$. Similarly, the output terminals C5, C6, C7 and C8 are progressively connected to ground and in trailing relation the terminals C4, C5, C6 and C7 are disconnected from ground to provide the remainder of the half cycle of the first simulated sine voltage wave 48 which exists during the time interval $t_6-t_{10}$ and which has frequency, phase, and magnitude characteristics.

As shown in FIG. 2, the "data in" switch 63 is opened at the time $t_8$. to initiate the first half cycle of the first portion of the second simulated sine wave. This first portion of the second sine wave is represented by the portion of the curve 48 between the time intervals $t_9$–$t_{14}$. The second sine wave has frequency, phase, and magnitude characteristics. The phase characteristic thereof is shifted 180° from the phase of the first sine wave. The opening of the Data IN switch causes the potential at terminal 62 to go to ground. This results in a ground potential at the input terminal 64 of the NAND device 66 and a positive potential at the input terminal 70 of the NAND device 72 due to the inversion action of the inverter 68. Since at this time the terminal 73 of the device 66 was already at ground potential no change occurred in the potential of the output terminal of the device 66 which remained positive. Similarly, the change in potential of the input terminal 70 of the NAND device 72 was without effect since the input terminal 74 of this NAND device 72 was previously at ground potential. At the time $t_9$, however, the flip-flop 10 became flipped to supply a negative going pulse to the flip-flop 10 became flipped to supply a negative going pulse to the flip-flop 12. This caused a reversal of the output potentials at its terminals 1 and O; the terminal O going from a positive to ground potential and the terminal 1 going from ground to a positive potential. This ground potential at the O output of the flip-flop 12 causes the one-shot device 76 to provide output pulse at time $t_9$ as indicated by the line OS. This positive going pulse raises the potential of both input terminals 73 and 74. Since the input terminal 70 of the device 72 was already positive the device 72 provides a ground potential at the input terminal S of the flip-flop 28 which flips this flip-flop to place the terminal 1 at positive potential and the terminal O at ground potential as indicated by the curve FFM of FIG. 2. Since both terminals of both NAND devices 20 and 22 are thereby reversed and each thereof has one grounded input, the output potentials of these devices 20 and 22 remain unchanged, the bus 34 remains positive and the transistor 36 conductive so that the next half cycle is positive resulting a phase shift of 180° in the wave 48.

A second half cycle similar to the first half cycle above described occurs during the interval $t_{10}$–$t_{17}$. At the time $t_{17}$, however, the flip-flop 10 flips to place its output terminal 1 at ground to cause the flip-flop 12 to return to its initial position in which the terminal 0 thereof is positive and the terminal 1 thereof is at ground potential. The flipping of flip-flop 12 as above described does not result in the pulsing of the devices 66 and 72 by the one-shot device 76 since the negative going pulse to the S terminal of the flip-flop 28 occurred at time $t_9$ and the flip-flop 28 remains in its position, as set at the time T9, to retain the terminal 26 positive. The flipping of the flip-flop 12 did however place a positive potential on terminal 18 of the NAND device 22. Since both the terminals 18 and 26 are positive the output terminal 32 goes to ground potential.

As above described, with the bus 34 at ground potential the transistor 36 becomes non-conducting and because of the inverting operation of the inverter 8 positive potential is applied to the base of the transistor 40 to establish a conductive condition thereof and a negative half cycle of the wave 48. The terminal C8 is grounded at the time $t_{17}$–$t_{18}$ and current will flow from the positive terminal 42 through resistors R8 and R9 and the transistor 40 to provide the potential as indicated on the curve 48 during the interval $t_{17}$–$t_{18}$. Subsequent oscillations of the oscillator caused the decoder 14 progressively connect the terminals C–C8 to ground as indicated by the curve C1–C8 whereby current flows in sequence through the resistors R9–R4, R9–R5, R9–R6, R9–R7, R9–R6, R5–R9, R9–R4, and R9–R8, to provide the stepped wave portions of curve 48 which appear between the time intervals $t_{18}$ and $t_{26}$. At the time $t_{25}$, the flip-flop 10 again reverses and the terminal 1 thereof goes to ground potential to flip the flip-flop 12 to place it in its condition in which its O terminal energizes the one-shot 76 to place the NAND devices 20 and 22 and bus 34 in the same condition as existed at the time $t_{10}$. The portions of the wave appearing between the time intervals $t_{26}$ and $t_{33}$ and between $t_{34}$ and $t_{25}$.

At the time $t_{40}$, the curve Data IN shows a change in data requiring the wave 48 to be phase shifted at the next crossing of the axis 46 to establish a second portion of the first simulated sine wave; the first half cycle thereof which is of the same polarity at the last half cycle of the second simulated sine wave which terminates at the zero axis 46. With the switch 63 closed a positive potential exists at the input terminal 62. This causes the input terminal 64 of the NAND device 66 to become positive and the input terminal 70 of the NAND device 72 to go to round potential. This is without immediate effect since the terminals 73 and 74 of these devices were already at ground potential and as long as one terminal of either of these devices is at ground potential the output potential thereof will be unchanged by any change in potential of the other input terminal thereof. At the time $t_{41}$, however, the flip-flop 10 again flips to flip the flip-flop whereby the one-shot device 76 provides a pulse to each of the input terminals 73 and 74. The pulse supplied to the input terminal 74 of the NAND device 72 is without effect however the positive potential pulse supplied to the input terminal 73 of the NAND device 66 causes a ground potential pulse at the input terminal C of the flip-flop 28. This causes the flip-flop 28 to reverse the polarity of its output terminals 1 and 0 so that the input terminal 24 of the NAND device 20 is at a positive potential as well as the input terminal 16 thereof. The terminal 16 was placed at positive potential due to flipping of the flip-flop 12. Under these conditions, the bus 34 will be at ground potential, the positive half cycle transistor 36 will be non-conductive and the negative half cycle transistor 40 will be conductive to provide a stepped half cycle of pulse as indicated by curve 48 between the time intervals $t_{42}$ and $t_{49}$ in the manner described above.

At the time $t_{49}$ the flip-flop 10 will again be flipped to flip the flip-flop 12 to cause its O terminal to become positive and its 1 terminal to be connected to ground. Under these conditions the terminal 16 of the NAND device 20 and the terminal 26 of the NAND device 22 are both at ground potential whereby the output terminals 30 and 32 of the NAND devices 20 and 22 are both positive to render the bus 34 positive. This causes the positive half cycle transistor 36 to the conductive and the negative half cycle transistor 40 to be nonconductive. Continued operation of the oscillator causes the generation of the next half cycle of the second portion of the first simulated sine wave as represented by the portion of the curve 48 between the times $t_{50}$ and $t_{57}$.

At the time $t_{56}$, the Data IN transmitter 61 actuates the switch 63 to open circuit position causing the input terminal 62 to go to ground potential to establish a second portion of the second simulated sine wave as illustrated by a curve 48 starting at time $t_{58}$. The potential of the input terminal 64 goes to ground and that of the terminal 70 becomes positive. Therefore at the time $t_{57}$, when the reversal of the output potential of the flip-flop 12 causes the one-shot device 76 to flip the flip-flop 28. The flip-flop 12 is prevented from providing two positive impulses to either of the NAND circuits 20 and 22. Continued pulsing of the oscillator therefore will generate the portion of the curve 48 between the time intervals $t_{58}$ *and* $t_{65}$ which is a phase-shifted from the immediately preceding portions of the curve 48. The apparatus continues as before described, to provide the remainder of the curve 48. At the time $t_{77}$, the "carrier on" switch 82 is closed to raise the potential of the input terminal of the inverter 80. As indicated by the curve "carrier on" the inverter 80 supplies a ground potential to the C terminals of all of the flip-flops 6–12. This ground potential resets these flip-flops to their initial condition and prevents further actuation of the flip-flops 6–12 by the oscillator 1.

The voltage generated at terminal 44 is applied to the input terminal 50 of the high impedance input of the buffer 52 which generates a similar wave. The output of the buffer 52 is sufficient to the input terminal 56 of the filter and conditioner 58. A filtered sine wave is obtained at the output terminal 60.

It will be appreciated from the foregoing that no matter where in the half cycle the Data IN switch 63 is actuated, the change in the phase of the output wave 48 and consequently that of the sine wave at the output terminal 60 of the filter and condition 58 will always occur at 0° or 180° crossing of the simulated sine wave 48 with the neutral axis 46. Since the phase reversal can occur only at these times, ringing is prevented in the tuned circuits found in the interconnection between the output terminal 44 and the receiver to which signal is transmitted. Under these conditions the rate at which the data can be transmitted through the transmission line is increased since there is no necessity for a delay to permit the ringing to die out before the receiver responds to the transmitted sine wave.

What is claimed and is desired to be secured by United States Letters Patent is as follows:

1. The method of generating intelligence, said method comprising the steps of generating a first voltage wave comprising an integral number of first stepped half waves of voltage, each of said first half waves being os substantially sinusoidal form, each of said half waves comprising a first series of first spaced pulses of voltage, the amplitudes of each said first pulses having a selected relationship relative to the angle at which each said first pulse occurs in each of said first half waves, said selected amplitudes being directly proportional to the sine of the angle at which each such said first pulse occurs in its respective said first half wave, the total angle of each of said first half waves being substantially 180° said total angle being the angle between the said angle at which said first pulse occurs and the said angle at which the next subsequent said first pulse occurs, of subsequently generating a second voltage wave comprising an integral number of second stepped half waves of voltage, each of said second half waves being of substantially sinusoidal form, each of said second half waves comprising a second series of second spaced pulses of voltage, the amplitudes of each said second pulses having a desired relationship relative to the angle at which each such said second pulse occurs in each of said second half waves, said desired amplitudes being directly proportional to the sine of the angle at which each such said second pulse occurs in its respective said second half wave, the total angle of each of said second half waves being substantially 180°, said total angle being the angle between the said angle at which said second pulse occurs and the said angle at which the next subsequent said second pulse occurs, of terminating the generation of said first voltage wave with the last said first pulse which completes the said total angle of the last to occur of said first half waves of said first voltage wave and of thereafter initiating the generation of said second stepped wave with a said second half wave having the same polarity as the last said first half wave of said first voltage wave.

2. The method of claim 1 in which said total angles of all of said half waves of said first waves are of equal magnitude and in which said second total angles of all of said half waves of said second wave are of equal magnitude.

3. The method of claim 2 in which said first and second magnitudes are equal to each other.

4. In an intelligence transmitting apparatus, first means providing a first stepped wave of voltage which is substantially sinusoidal and which includes at least one first half cycle, each said first half cycle pulsating in magnitude from an initial to a final value said means further providing a second stepped wave of voltage which is substantially sinusoidal and which includes at least one second half cycle, each said second half cycle of said second wave pulsating in magnitude from an initial to a final value, each said wave having frequency and phase and magnitude characteristics, one of said characteristics of said second wave being of different magnitude than the comparable characteristic of said first wave, second means providing first and second initiating signals to control the operation of said first means whereby said first and second waves may be provided, and third means operable when said first means is providing one of its said waves to prevent said second means from causing said first means to provide the other of its said stepped waves until the magnitude of said half cycle of the said wave then being provided reaches its said final value.

5. The combination of claim 4 in which said second means always causes the initiation of the operation of said first and second means at its said initial value.

6. The combination of claim 5 in which said initial and final values are of the same magnitude.

7. The combination of claim 5 in which said waves are voltage quantities and said initial and final values are of a magnitude equal to one-half of the geometric sum of the maximum voltages at successive said first waves and successive said second waves.

8. In an intelligence transmitting apparatus, first means for generating either a first or a second stepped wave of voltage, second means controlling said first means, said second means having a first operating condition in which said first means is conditioned to provide said first sine wave, said second means having a second operating condition in which said first means is conditioned to provide said second sine wave, and third means preventing a change in the said wave which is being generated by said first means except when the said wave which is being generated by said first means is substantially at its 180° or at its 360° interval.

9 . The combination of claim 8 in which the waves generated by said first means are of different phase from the waves generated by said second means.

* * * * *